US012704189B2

(12) United States Patent
Zhang et al.

(10) Patent No.: US 12,704,189 B2
(45) Date of Patent: Aug. 11, 2026

(54) ONE-WAY FINISH VALVE SUITABLE FOR HYDROGEN-ENERGY HANDHELD TORCH

(71) Applicant: BEIJING AEROSPACE PETROCHEMICAL TECHNOLOGY & EQUIPMENT ENGINEERING CORPORATION LIMITED, Beijing (CN)

(72) Inventors: Yunlong Zhang, Beijing (CN); Yingren Ding, Beijing (CN); Yusheng Guo, Beijing (CN); Jianqiang Wang, Beijing (CN); Zongjie Han, Beijing (CN)

(73) Assignee: BEIJING AEROSPACE PETROCHEMICAL TECHNOLOGY & EQUIPMENT ENGINEERING CORPORATION LIMITED, Beijing (CN)

( * ) Notice: Subject to any disclaimer, the term of this patent is extended or adjusted under 35 U.S.C. 154(b) by 163 days.

(21) Appl. No.: 18/716,813

(22) PCT Filed: Apr. 11, 2022

(86) PCT No.: PCT/CN2022/086010
§ 371 (c)(1),
(2) Date: Jun. 5, 2024

(87) PCT Pub. No.: WO2023/103238
PCT Pub. Date: Jun. 15, 2023

(65) Prior Publication Data
US 2025/0035222 A1 Jan. 30, 2025

(30) Foreign Application Priority Data
Dec. 6, 2021 (CN) .......................... 202111511584.5

(51) Int. Cl.
*F16K 15/20* (2006.01)
*F16K 15/02* (2006.01)
(Continued)

(52) U.S. Cl.
CPC .......... *F16K 15/025* (2013.01); *F16K 25/005* (2013.01); *F17C 13/04* (2013.01); *F17C 2221/012* (2013.01)

(58) Field of Classification Search
CPC ...... F16K 15/025; F16K 25/005; F16K 15/02; F16K 15/20; F16K 1/303;
(Continued)

(56) References Cited

U.S. PATENT DOCUMENTS 1,595,786 A * 8/1926 Johnson .................. F16K 25/04
251/210
2,271,785 A * 2/1942 Watkins .................. F16K 1/303
251/263
(Continued)

FOREIGN PATENT DOCUMENTS

CN 2580284 Y 10/2003
CN 201059377 Y 5/2008
(Continued)

OTHER PUBLICATIONS

Chinese Office Action for corresponding 202111511584.5, mailed Aug. 12, 2022. (Chinese and English language document). (13 pages).

(Continued)

*Primary Examiner* — Marina A Tietjen
(74) *Attorney, Agent, or Firm* — Maginot, Moore & Beck, LLP

(57) ABSTRACT

A one-way cylinder opening valve suitable for a hydrogen energy handheld torch is provided and includes a valve
(Continued)

body, a valve core assembly, a spring, a spring chamber, and a sealing ring. The spring chamber is connected to the valve body, the valve core assembly and the spring are arranged in the spring chamber, a valve body sealing lip is arranged on the valve body, and the sealing lip and the valve core assembly are sealed by means of a principle of compressing a non-metallic material to reach a sealing specific pressure of the non-metallic material, and the spring provides a sealing force for the valve core assembly; the sealing ring is arranged on an outer side of the valve body, so as to ensure sealing between the valve body and a gas cylinder. A through hole is provided in the spring chamber and used as a hydrogen inlet, and a hydrogen intake hole and a central flow channel of a valve core are provided in the valve core assembly. An external force needed to open the cylinder opening valve is greater than a sealing force provided by the spring for the valve core assembly and an upward medium force applied to the valve core assembly in an under-pressure state, hydrogen enters a central through hole in the valve body through the hydrogen inlet, the spring chamber, the hydrogen intake hole and the central flow channel of the valve core, and flows out via the central through hole, so as to realize hydrogen discharging.

4 Claims, 4 Drawing Sheets

(51) Int. Cl.
*F16K 25/00* (2006.01)
*F17C 13/04* (2006.01)

(58) Field of Classification Search
CPC ................ F16K 1/44–443; F17C 13/04; F17C 2221/012; Y02E 60/32; Y02P 90/45; Y10T 137/7868
See application file for complete search history.

(56) References Cited

U.S. PATENT DOCUMENTS 2,927,767 A * 3/1960 Ray ........................... F16K 1/42 251/210
4,402,340 A * 9/1983 Lockwood, Jr. ........ F16K 1/305 251/210
4,760,865 A * 8/1988 Rilett ...................... F17C 13/04 220/86.1
5,007,614 A * 4/1991 Lockwood, Jr. ........ F17C 13/04 251/210
2004/0144803 A1* 7/2004 Baker .................... B65D 47/02 222/147
2009/0266816 A1* 10/2009 Holroyd .................. F16K 1/308 220/203.01

FOREIGN PATENT DOCUMENTS

CN 201547490 U 8/2010
CN 207129388 U 3/2018
CN 109296812 A 2/2019
GB 2312268 A * 10/1997 ............. F16K 1/303
JP H02009381 U 1/1990
JP 2020008038 A 1/2020

OTHER PUBLICATIONS

Japanese Office Action for corresponding application No. JP2024534046, mailed Jun. 17, 2025. (Japanese and English language document). (8 pages).
Office Action for corresponding application No. JP2024-534046, mailed Oct. 14, 2025. (Japanese and English language document). (8 pages).

* cited by examiner

ONE-WAY FINISH VALVE SUITABLE FOR HYDROGEN-ENERGY HANDHELD TORCH

CROSS-REFERENCE TO RELATED APPLICATION

This application is a National Stage Application under 35 USC § 371 of International Application PCT/CN2022/086010, filed Apr. 11, 2022, which claims the benefit of and priority to Chinese Patent Application No. 202111511584.5, entitled "ONE-WAY FINISH VALVE SUITABLE FOR HYDROGEN-ENERGY HANDHELD TORCH", filed with the China National Intellectual Property Administration on Dec. 6, 2021, the entire content of which is incorporated herein by reference.

FIELD

The present disclosure relates to the field of valves, and more particularly to one-way cylinder opening valve suitable for a hydrogen energy handheld torch.

BACKGROUND

A hydrogen energy handheld torch uses hydrogen stored in a gas cylinder as a fuel, and a pressure of the gas cylinder may reach 70 MPa G, which involves a low opening and closing torque and reliable sealing of the gas cylinder. Hydrogen has a small molecular weight and is easier to escape compared with other gas fuels. Therefore, there is a higher requirement for controlling a sealing performance of opening and closing components of the gas cylinder. Since an internal space of the hydrogen energy handheld torch is narrow and a total weight also needs to be controlled, a cylinder opening valve needs to be lightweight and miniaturized.

Due to a large volume and weight of a traditional gas cylinder valve, the traditional gas cylinder valve cannot be directly applied to the hydrogen energy handheld torch. CN 201059377Y discloses a detachable normally closed valve. The valve is sealed by pressing a valve core plane against a gasket. Under hydrogen working conditions under high pressures, in case that a sealing structure size of the valve is large, on the one hand, a medium force applied to the valve core is large, resulting in a large opening force of the valve, which makes it difficult for torchbearers to operate at a torch relay site. On the other hand, since the hydrogen has a small molecular weight and is difficult to seal, parts with large-size sealing structures are difficult to process and have poor precision. In case that a sealing structure size of the valve is small, the gasket is easily crushed, resulting in a loss of sealing performance of the valve. Therefore, a cylinder opening valve suitable for high pressure and hydrogen medium is needed to meet needs of hydrogen energy handheld torch.

SUMMARY

A one-way cylinder opening valve suitable for a hydrogen energy handheld torch is provided and includes a valve body, a valve core assembly, a spring, a spring chamber, and a sealing ring. The spring chamber is connected to the valve body, the valve core assembly and the spring are arranged in the spring chamber, a valve body sealing lip is arranged on the valve body, and the sealing lip and the valve core assembly are sealed by means of a principle of compressing a non-metallic material to reach a sealing specific pressure of the non-metallic material, and the spring provides a sealing force for the valve core assembly. The sealing ring is arranged on an outer side of the valve body, so as to ensure sealing between the valve body and a gas cylinder. A through hole is provided in the spring chamber and used as a hydrogen inlet, and a hydrogen intake hole and a central flow channel of a valve core are provided in the valve core assembly. An external force needed to open the cylinder opening valve is greater than a sealing force provided by the spring for the valve core assembly and an upward medium force applied to the valve core assembly in an under-pressure state, hydrogen enters a central through hole in the valve body through the hydrogen inlet, the spring chamber, the hydrogen intake hole and the central flow channel of the valve core, and flows out via the central through hole, so as to realize hydrogen discharging.

Figure 1:
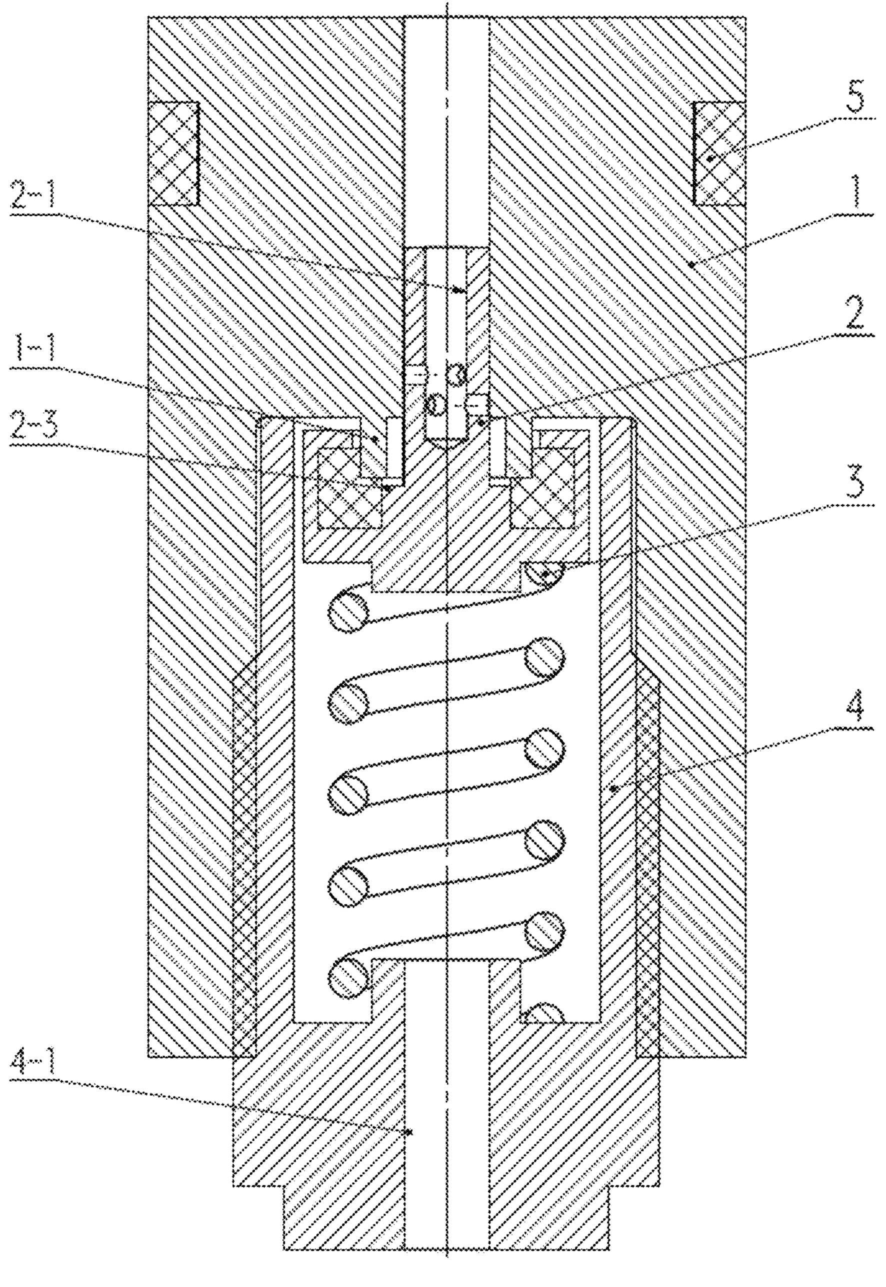
FIG. 1 is a schematic diagram of a one-way cylinder opening valve of the present disclosure.

Reference numerals: valve body 1, valve core assembly 2, spring 3, spring chamber 4, and sealing ring 5.

DETAILED DESCRIPTION

The present disclosure is described in detail below in combination with examples.

A one-way cylinder opening valve suitable for a hydrogen energy handheld torch provided in the present disclosure is described in detail below in combination with the accompanying drawings and specific implementations.

As shown in FIG. 1, in the present disclosure, a one-way cylinder opening valve is composed of a valve body 1, a valve core assembly 2, a spring 3, a spring chamber 4 and a sealing ring 5. The valve core assembly 2 and the spring 3 are arranged in the spring chamber 4. The spring chamber 4 is connected to the valve body 1 via internal threads, and the valve body 1 is connected to the gas cylinder via external threads. The sealing ring 5 is arranged on an outer side of the valve body 1, so as to ensure sealing between the valve and the gas cylinder. The valve core assembly 2 and the spring 3 are arranged in the spring chamber 4. The spring chamber 4 is connected to the valve body 1 via the internal thread, and the valve body 1 may be connected to the gas cylinder via the external thread. The sealing ring 5 is arranged on the outer side of the valve body 1, so as to ensure the sealing between the valve and the gas cylinder, thus having a function of hydrogen filling. According to different operating pressures, the one-way cylinder opening valve is configured with valve core assemblies having different structures, including in a form of an inlaid or injection-molded non-metallic material, and in a form of an extrusion molded sealing ring. When the valve core assembly is in the form of the inlaid or injection-molded non-metallic material, a direction of a force applied to the valve core assembly is perpendicular to a deformation direction of the material, which is suitable for hydrogen working conditions below 20 MPa G. When the valve core assembly is in the form of the extrusion molded sealing ring, a direction of a force applied to the valve core assembly is at a wide angle to the deformation direction of the material, which is suitable for hydrogen working conditions of 70 MPa G.

As shown in FIG. 1, the internal threads of the valve body 1 are configured to connect the valve body 1 to the spring chamber 4. The external threads are configured to connect the one-way cylinder opening valve to the gas cylinder. The sealing ring 5 is arranged on the outer side of the valve body 1, so as to ensure the sealing between the valve and the gas cylinder. An upper end of an inner chamber of the valve body is provided with an annular sealing lip 1-1, which is a sealing surface of the valve body 1. The spring 3 is arranged in the spring chamber 4, and a spring force is configured to provide a sealing force for the valve core assembly 2. In addition, an upward medium force is applied to the valve core assembly 2 in an under-pressure state, so as to ensure the sealing of high-pressure hydrogen. The valve core assembly 2 has various forms, such as the inlaid or injection-molded non-metallic material, and the extrusion molded sealing ring, which may be selected according to the operating pressures.

Figure 2A:
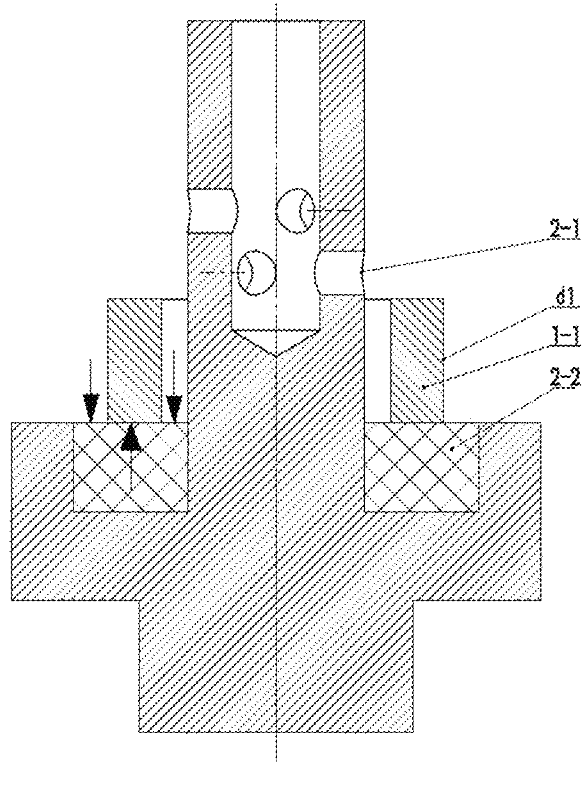
FIG. 2 is a schematic diagram of a sealing principle of a valve core assembly under different working conditions.
Figure 2B:
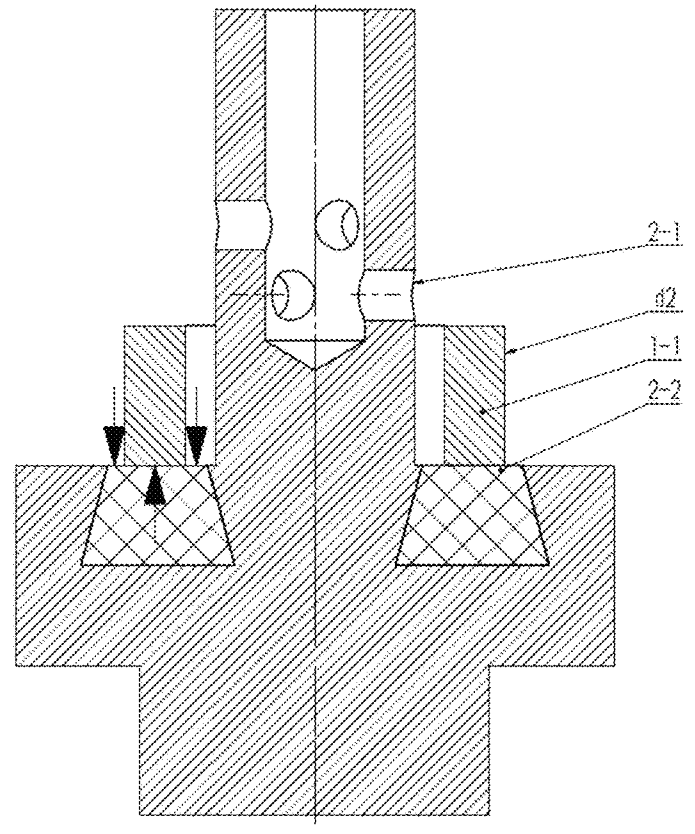
Figure 2C:
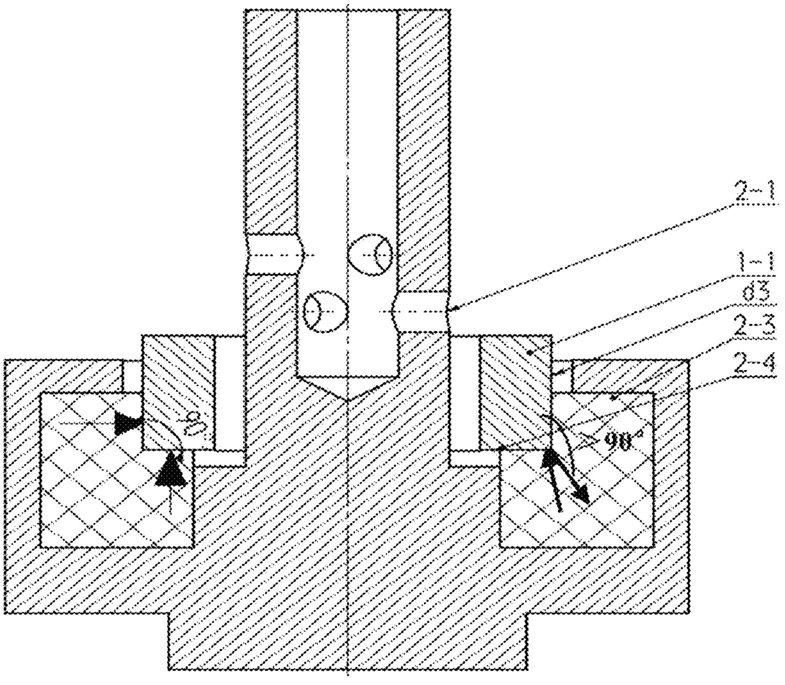

According to different operating pressures, the one-way cylinder opening valve is configured with the valve core assemblies having different structures, which has characteristics of reliable sealing, miniaturization and lightweight, and also has the function of hydrogen filling to meet needs of the gas cylinder in the hydrogen energy handheld torch. FIGS. 2A-2C show the valve core assemblies 2 having different forms, and the valve core assemblies 2 are provided with air guide holes 2-1. FIG. 2A shows the valve core assembly 2 in the form of the inlaid non-metallic material. The non-metallic material may be a polytetrafluoroethylene, a nylon, etc., which is suitable for an operating pressure of 10 MPa. FIG. 2B shows the valve core assembly 2 in the form of the injection-molded non-metallic material, and the non-metallic material may be a poly (ether-ether-ketone) resin, a polyimide, etc., which is suitable for an operating pressure of 20 MPa. FIG. 2C shows the valve core assembly 2 in the form of the extrusion molded sealing ring, which is suitable for an operating pressure of 70 MPa. A sealing principle of the valve core assemblies in FIGS. 2A and 2B is that the valve body sealing lip 1-1 vertically compresses the non-metallic material 2-2 of the valve core assembly to achieve sealing after reaching a sealing specific pressure of the material. The two valve core assemblies are provided with small sealing structures, and medium pressures applied to the valve core assemblies are small, so that an opening force of the valve is small. A diameter d1 of the valve body sealing lip matched with the valve core assembly in the form of the inlaid non-metallic material ranges from 2 to 10 mm, preferably from 2.5 to 8 mm. A diameter d2 of the valve body sealing lip matched with the valve core assembly in the form of the injection-molded non-metallic material ranges from 2 to 8 mm, preferably from 2.5 to 7 mm. A diameter d3 of the valve body sealing lip matched with the valve core assembly in the form of the extrusion molded sealing ring ranges from 2 to 5 mm, preferably from 2.5 to 4 mm.

FIG. 2C shows the valve core assembly 2 in the form of the extrusion molded sealing ring, which is a soft and hard tight fitting sealing structure. A sealing principle of the valve core assembly in FIG. 2C is that the sealing ring 2-3 wraps an outer edge of the valve body sealing lip 1-1 with an enveloping angle of 90° to ensure sealing in both radial and axial directions, and the valve body sealing lip and the valve core assembly are provided with metal stops 2-4 to prevent the valve body sealing lip 1-1 from crushing an axial position of the sealing ring 2-3 under a high-pressure working condition. Such valve core assembly structure may still adopt a small sealing structure dimension d3, and d3 ranges from 2 to 5 mm, preferably from 2.5 to 4 mm. Although a medium pressure is high, a medium force applied to the valve core assembly is small, so an opening and closing force of the cylinder opening valve is small, which is suitable for operating needs of high pressure and low opening force.

Figure 3:
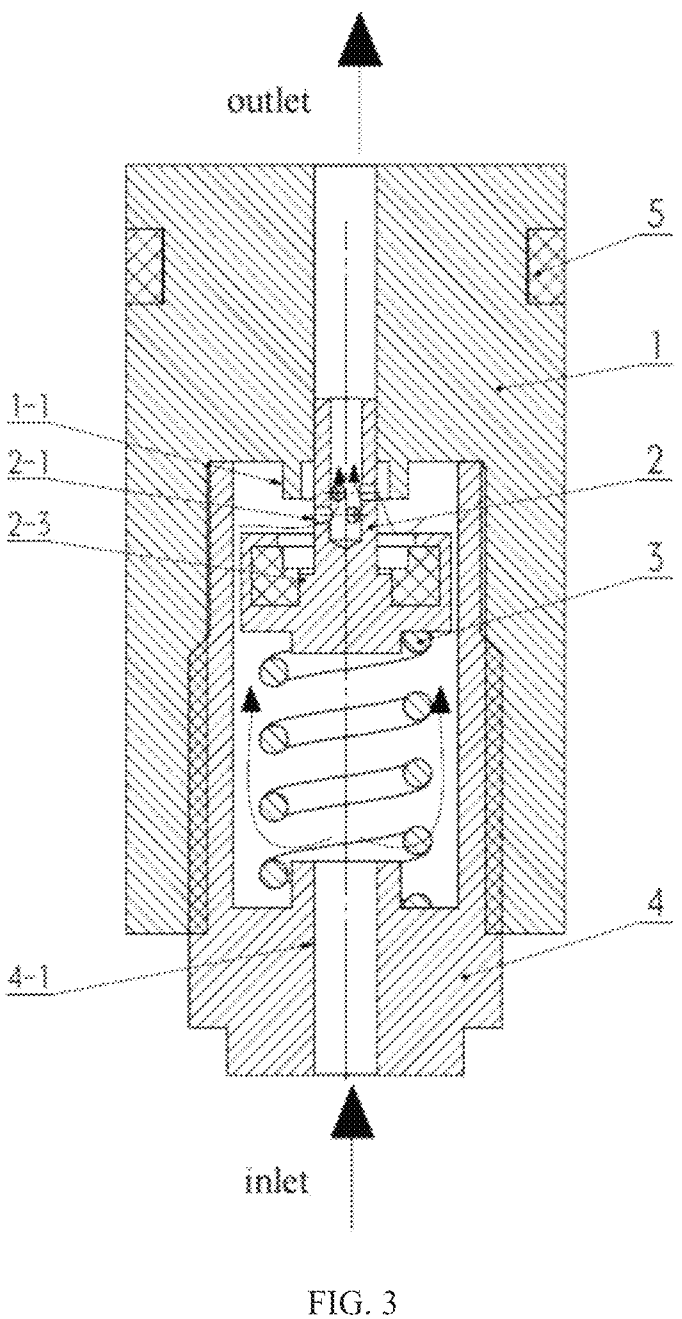
FIG. 3 is a schematic diagram of flow of hydrogen when a one-way cylinder opening valve is opened.

As shown in FIG. 3, when a downward opening force is applied to the one-way cylinder opening valve, the valve core assembly 2 overcomes the medium force and the spring force to generate a downward displacement, and hydrogen flows through spring chamber 4 and the valve core assembly sequentially to realize a hydrogen releasing function. When the valve is in an open state, the hydrogen flows reversely to realize a hydrogen charging function. As shown in FIG. 1, when the opening force is withdrawn and the upward medium force and the spring force are applied to the valve core assembly 2, the valve core assembly 2 automatically returns to its original position and the valve is closed.

As shown in FIG. 1, the spring 3 is arranged in the spring chamber 4 to provide the sealing force for the valve core assembly in the form of the inlaid or injection-molded non-metallic material. As shown in FIG. 1, the spring chamber 4 is arranged and is connected to the valve body 1 via the threads, so that the valve core assembly 2 and the spring 3 are arranged in the spring chamber 4, and a lower end of the spring chamber 4 is provided with a through hole 4-1, which is an inlet of the cylinder opening valve.

The technical problem to be solved by the present disclosure is to provide a one-way cylinder opening valve suitable for a hydrogen energy handheld torch, which has characteristics of reliable sealing, miniaturization and light weight, and also has a function of hydrogen filling.

Technical solutions of the present disclosure are as follows. A one-way cylinder opening valve suitable for a hydrogen energy handheld torch is provided and includes a valve body, a valve core assembly, a spring, a spring chamber, and a sealing ring. The spring chamber is connected to the valve body, the valve core assembly and the spring are arranged in the spring chamber, a valve body sealing lip is arranged on the valve body, and the sealing lip and the valve core assembly are sealed by means of a principle of compressing a non-metallic material to reach a sealing specific pressure of the non-metallic material, and the spring provides a sealing force for the valve core assembly. The sealing ring is arranged on an outer side of the valve body, so as to ensure sealing between the valve body and a gas cylinder. A through hole is provided in the spring chamber and used as a hydrogen inlet, and a hydrogen intake hole and a central flow channel of a valve core are provided in the valve core assembly. An external force needed to open the cylinder opening valve is greater than a sealing force provided by the spring for the valve core assembly and an upward medium force applied to the valve core assembly in an under-pressure state, hydrogen enters a central through hole in the valve body through the hydrogen inlet, the spring chamber, the hydrogen intake hole and the central flow channel of the valve core, and flows out via the central through hole, so as to realize hydrogen discharging.

In some embodiments, the valve core assembly comprises the valve core and a structural member of a non-metallic material. The valve core comprises a central valve core, a bottom cylinder and a large-diameter structure between the central valve core and the bottom cylinder for installing the structural member of the non-metallic material. The central valve core is axially provided with the central flow channel of the valve core, and a side wall of the flow channel is provided with the hydrogen intake hole. The bottom cylinder is configured to install one end of the spring, an installation position of the structural member of the non-metallic material corresponds to a position of the valve body sealing lip, and an angle between a direction of a force applied to the structural member of the non-metallic material and a deformation direction of the non-metallic material during sealing is varied to adapt to hydrogen working conditions under different pressures.

In some embodiments, the structural member of the non-metallic material is in a form of an inlaid or injection-molded non-metallic material or an extrusion molded sealing ring.

In some embodiments, a direction of a force applied to the valve core assembly is perpendicular to a deformation direction of the non-metallic material, which is suitable for hydrogen working conditions below 20 MPa G.

In some embodiments, the structural member of the non-metallic material is an annular member, and when a cross-sectional shape of the annular member is quadrangular, the structural member is installed in an inlaid manner, and is suitable for hydrogen working conditions not higher than 10 MPa G. When a cross-sectional shape of the annular member is isosceles trapezoid, the structural member is installed in an injection-molded manner, and is suitable for hydrogen working conditions not higher than 20 MPa G.

In some embodiments, when the cross-sectional shape of the annular member is quadrilateral, the non-metallic material is selected from polytetrafluoroethylene or nylon. When the cross-sectional shape of the annular member is isosceles trapezoid, the non-metallic material is selected from a poly (ether-ether-ketone) resin or polyimide.

In some embodiments, a direction of a force applied to the valve core assembly is at a wide angle to the deformation direction of the material, which is suitable for hydrogen working conditions below 70 MPa G.

In some embodiments, the structural member of the non-metallic material is a stepped annular member, and other surfaces except stepped surfaces of the structural member are wrapped and installed by the large-diameter structure on the valve core assembly, the stepped surfaces wrap an outer edge of the valve body sealing lip with an enveloping angle of 90° to ensure sealing in both radial and axial directions, and the valve body sealing lip and the valve core assembly are provided with metal stops to prevent the valve body sealing lip from crushing the structural member of the non-metallic material in an axial position under a high pressure working condition.

In some embodiments, the valve body sealing lip is a cylindrical structure arranged at one end of the central through hole in the valve body, and after the central valve core is inserted into the central through hole, a gap is left between an outer wall of the central valve core and an inner wall of the cylindrical structure.

In some embodiments, a diameter d1 of the valve body sealing lip matched with the valve core assembly in a form of the inlaid non-metallic material ranges from 2 to 10 mm, preferably from 2.5 to 8 mm. A diameter d2 of the valve body sealing lip matched with the valve core assembly in a form of the injection-molded non-metallic material ranges from 2 to 8 mm, preferably from 2.5 to 7 mm. A diameter d3 of the valve body sealing lip matched with the valve core assembly in a form of the extrusion molded sealing ring ranges from 2 to 5 mm, preferably from 2.5 to 4 mm.

The purpose of the present disclosure is to provide the one-way cylinder opening valve suitable for the hydrogen energy handheld torch, which has characteristics of reliable sealing, miniaturization and light weight, and also has a function of hydrogen filling.

In the present disclosure, the one-way cylinder opening valve works in coordination with a switch component of the hydrogen energy handheld torch, and is configured to execute instructions for opening or closing the gas cylinder.

In the present disclosure, when an opening force is applied to the one-way cylinder opening valve, the valve is opened, and hydrogen may flow bidirectionally, thus realizing functions of hydrogen releasing and hydrogen charging. When the opening force is withdrawn, the valve core assembly automatically returns and the valve is closed.

In the present disclosure, a sealing size is small, the medium force applied to the valve core assembly is small, and an opening force of the valve is small, thus realizing the miniaturization and lightweight design of the valve.

In the present disclosure, the valve core assembly may adopt various structural forms, including in a form of an inlaid or injection-molded non-metallic material, and in a form of an extrusion molded sealing ring, etc., which may be selected according to operating pressures.

In the present disclosure, the valve core assembly in the form of the extrusion molded sealing ring adopts a soft and hard tight fitting sealing structure, and the sealing ring clings to an outer edge of a metal sealing lip with an enveloping angle of 90°, and the valve body sealing lip and the valve core assembly are provided with the metal stops to prevent the valve body sealing lip from crushing the sealing ring under the high pressure working condition, which is more suitable for high pressure hydrogen sealing.

The basic principle, main features and advantages of the present disclosure have been shown and described above. The present disclosure is not limited by the above-mentioned implementations. What has been described in the above-mentioned implementations and specifications is merely the principle of the present disclosure. Various changes and improvements may be made in the present disclosure without departing from the spirit and scope of the present disclosure, and these changes and improvements fall within the scope of the present disclosure. The scope of the present disclosure is defined by the appended claims and their equivalents.

What is claimed is:

1. A one-way cylinder opening valve suitable for a hydrogen energy handheld torch, comprising:

a valve body;

a valve core assembly;

a spring;

a spring chamber; and a sealing ring;

wherein the spring chamber is connected to the valve body, the valve core assembly and the spring are arranged in the spring chamber, a valve body sealing lip is arranged on the valve body, and the valve body sealing lip and the valve core assembly are sealed by means of a principle of compressing a non-metallic material to reach a sealing specific pressure of the non-metallic material, and the spring provides a sealing force for the valve core assembly; the sealing ring is arranged on an outer side of the valve body, so as to ensure sealing between the valve body and a gas cylinder; a through hole is provided in the spring chamber and used as a hydrogen inlet, and a hydrogen intake hole and a central flow channel of a valve core are provided in the valve core assembly; an external force needed to open the one-way cylinder opening valve is greater than the sealing force provided by the spring for the valve core assembly and an upward medium force applied to the valve core assembly in an under-pressure state, hydrogen enters a central through hole in the valve body through the hydrogen inlet, the spring chamber, the hydrogen intake hole and the central flow channel of the valve core, and flows out via the central through hole, so as to realize hydrogen discharging;

wherein the valve core assembly comprises the valve core and a structural member of the non-metallic material;

wherein the valve core comprises a central valve core, a bottom cylinder and a large-diameter structure between the central valve core and the bottom cylinder for installing the structural member of the non-metallic material; the central valve core is axially provided with the central flow channel of the valve core, and a side wall of the central flow channel is provided with the hydrogen intake hole; the bottom cylinder is configured to install one end of the spring, an installation position of the structural member of the non-metallic material corresponds to a position of the valve body sealing lip, and a direction of a resultant force of the sealing force and the medium force applied to the valve core assembly is at a wide angle to the deformation direction of the non-metallic material, and wherein the one-way cylinder opening valve is used for hydrogen working conditions below 70 MPa G; and wherein the structural member of the non-metallic material is a stepped annular member, and other surfaces except stepped surfaces of the structural member are wrapped and installed by the large-diameter structure on the valve core assembly, the stepped surfaces wrap an outer edge of the valve body sealing lip with an enveloping angle of 90° to ensure sealing in both radial and axial directions, and the valve body sealing lip and the valve core assembly are provided with metal stops to prevent the valve body sealing lip from crushing the structural member of the non-metallic material in an axial position under a high pressure working condition.

2. The one-way cylinder opening valve of claim 1, wherein the valve body sealing lip is a cylindrical structure arranged at one end of the central through hole in the valve body, and after the central valve core is inserted into the central through hole, a gap is left between an outer wall of the central valve core and an inner wall of the cylindrical structure.

3. The one-way cylinder opening valve of claim 1, wherein internal threads of the valve body are configured to connect the valve body to the spring chamber.

4. The one-way cylinder opening valve of claim 1, wherein external threads of the valve body are configured to connect the one-way cylinder opening valve to the gas cylinder.

* * * * *